TIMING GENERATOR WITH ELECTROCHEMICAL CONTROL ELEMENT
Filed Aug. 18, 1966
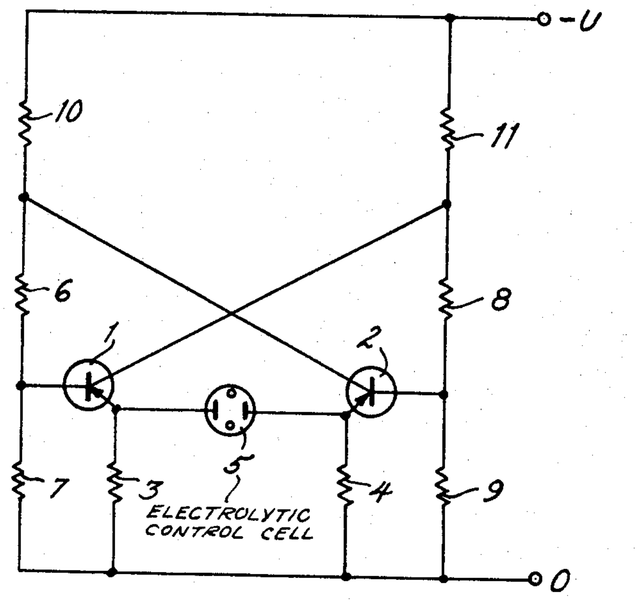
INVENTOR.
ERNST C. RIEDER
BY [signature]
ATTORNEY.

United States Patent Office 3,412,346
Patented Nov. 19, 1968

3,412,346
TIMING GENERATOR WITH ELECTROCHEMICAL CONTROL ELEMENT

Ernst C. Rieder, Frankfurt am Main, Germany, assignor to Varta Aktiengesellschaft, Hagen, Westphalia, Germany, a corporation of Germany Filed Aug. 18, 1966, Ser. No. 573,377
Claims priority, application Germany, Aug. 28, 1965, V 29,210
7 Claims. (Cl. 331—113)

ABSTRACT OF THE DISCLOSURE

A device for generating signals at preselected time intervals to provide timing cycles ranging from a few minutes to several days which comprises a multivibrator circuit including an electrochemical control cell for determining the timing cycle.

The present invention relates to an electrical timing generator capable of providing timing cycles ranging from a few minutes to several days.

A wide variety of timing generators are known, one example being multivibrators. For timing cycles exceeding a few minutes in length such as electronic devices become prohibitively complex because their timing cycles are generally determined by the time constants of circuits consisting of resistors and capacitors.

Mechanical timing generators are also known, but are likewise complex and expensive and incapable of operating without frequent alteration.

It is, accordingly, a principal object of the present invention to provide timing circuits which are free from one or more of the above-mentioned disadvantages.

It is another object to provide timing generators employing solely electronic circuits, and capable of achieving timing cycles ranging from a few minutes to several days.

These and other objects which will appear are achieved in accordance with the invention by connecting an electrolytic control cell into a circuit configuration corresponding generally to a multivibrator circuit arrangement.

For further details, reference may be had to the accompanying figure of drawings showing a preferred embodiment of the invention, and the description which follows.

Referring now to the drawings, the new timing generator is based on the basic circuit arrangement characterizing a bistable multivibrator. Thus the circuit comprises two transistors 1 and 2, which are generally connected in multivibrator configuration by means of resistors 6 through 11. However, in accordance with the present invention, the emitters of transistors 1 and 2 are not jointly connected via a common resistor to a point of zero potential, or ground, but each emitter is connected separately to ground, via its own respective resistor 3 and 4. The electrolytic control cell 5 is connected directly between emitters. Since the voltage drop across the control cell 5 is small compared to the voltage drop across the emitter resistors, the emitter current of the transistor which is in conduction is equally divided between the two resistors, provided these have equal resistance values. Half the emitter current then flows through the control cell 5. The base voltage dividers comprising resistor pairs 6, 7, and 8, 9, respectively, are of such values that the base current of the transistor in conduction is just enough to drive it into saturation; in other words, a sufficiently great, negative bias is applied between base and emitter.

Toward the end of the timing cycles the voltage across control cell 5 rises sharply and so does its internal resistance. The emitter current of the transistor in conduction then no longer divides equally between said emitter resistors, but flows mainly through the emitter resistor of the transistor in conduction.

As a result, the voltage drop across this resistor becomes so great that the transistor becomes non-conductive, the multivibrator flips over and the other transistor becomes conductive. This recurs at intervals determined by the control period of the electrochemical control cell 5. The timing cycle length is variable within comparatively narrow limits by changing the values of the emitter resistor. For wider variations the capacity of the control cell may be varied.

For stable operation, it is preferable to operate the circuit at a constant voltage. The current in the electrochemical cell is determined primarily by the values of resistors 10 and 11. Since the voltage drop across these resistors is large compared to the voltage drop across the cell, adequate stability is obtained.

A regulated power supply may be used to provide the operating voltage designated —U in the drawing. Since many conventional forms of such supplies are known, the same are not further described or illustrated herein.

The circuit need not necessarily operate symmetrically. By changing the relation between resistors 3 and 4, it is possible, within limits, to obtain alternately two time periods of differing lengths.

The output signals can be derived from the circuit, either directly at the collector leads or via coupling capacitors.

The circuit has application wherever it is desired to provide by relatively simple means a timing generator for timing cycles ranging from a few minutes to several days, and tolerances of 1 to 2% are acceptable.

Electrochemical cells which serve as control or measuring cells are known. These electrochemical cells are sealed containers or capsules which hold a liquid electrolyte and at least two electrodes. The container for the cell which is generally gas and liquid impervious comprises at least two electrodes between which the chemical reaction proceeds in the electrolyte, in a regulatable manner in either direction. The material which is passed between two electrodes is the working material. The electrode which carries a supply of the working material which is available for transfer to the other electrode is called the reservoir electrode. The electrode which receives or at which the working material is separated is called the working electrode. Since the direction of the current flow is reversible, any one of the electrodes can act as either reservoir or as working electrode during any particular process cycle.

When one of the electrodes comprises silver, upon passage of the current the silver passes anodically into solution in the electrolyte and deposits on the other electrode, the cathode or the working electrode. When the current is passed through the device in reverse direction, the working material is returned from the electrode acting as reservoir electrode to the other electrode. During each cycle of the electrochemical process the voltage is very limited; as soon as all of the silver of the anode is passed into solution, the voltage abruptly rises. The voltage rise can be used to initiate, or control any desired timing or other desired function. The duration of each cycle is determined particularly by the amount of silver and the amount of current passed.

The reservoir electrode and the working electrode are made of an electrically conductive carrier, especially a metal; the reservoir electrode can be made of the working material or be coated therewith. Thus, at least one electrode is made of a carrier material which is not the working material. The measuring and control capacity of the working electrodes adjusts to correspond to the Faraday law.

The electrolytes usually used in the previously known cells include acid solutions prepared from sulfuric or phosphoric acids; alkali metal cyanides, e.g., sodium and potassium cyanides; alkali metal hydroxides, e.g., sodium and potassium hydroxides; fluoroboric acid. and the like.

Details concerning the control cell itself and its internal functioning may be found in the copending U.S. patent application, Ser. No. 552,325, filed May 23, 1966.

A wide variety of transistors are suitable for use in the invention. The table below provides numerical information for two specific embodiments of the circuit, but without any implication that these embodiments are unique or in any way limit the scope of the invention.

| | Transistors 1 and 2 PNP type OC 304/2 | Transistors 1 and 2 NPN type BSY 80 |
|---|---|---|
| −U | 15 v. | 15 v. |
| Resistors 3, 4 | 1.6 kilohms each | 4.7 kilohms each. |
| Resistors 7, 9 | 9.1 kilohms each | 82 kilohms each. |
| Resistors 6, 8 | 84 kilohms each | 160 kilohms each. |
| Resistors 10, 11 | 16 kilohms each | 47 kilohms each. |
| Cell capacity | 1 ma.-hr | 600 μa.=hr. |
| Timing period | Ca. 2 hours | Ca. 4 hours. |

The invention is further defined in the appended claims.

What is claimed is:

1. A device for generating signals at selected time intervals which comprises a multivibrator circuit including as a timing element an electrochemical control cell which operates by metal transport between at least two electrodes for determining its timing cycle.

2. The device of claim 1 characterized in that said multivibrator circuit comprises two transistors having emitters connected to ground via resistors and connected to each other via said electrochemical control cell.

3. The device of claim 2 characterized in that the relationship between the values of said resistors determines the relationship between the respective non-conduction intervals of said transistors.

4. The device of claim 3 characterized in that said resistors have substantially equal values.

5. The device of claim 3 characterized in that said resistors have different values.

6. The device of claim 1 further comprising means for supplying substantially constant operating voltages to said multivibrator.

7. The device of claim 1 in which the electrochemical control cell is connected directly between the emitters of two transistors.

References Cited

UNITED STATES PATENTS

| | | | |
|---|---|---|---|
| 2,531,076 | 11/1950 | Moore | 307—88.5 |
| 3,268,834 | 8/1966 | Bradmiller et al. | 331—113 |

ROY LAKE, *Primary Examiner.*

S. H. GRIMM, *Assistant Examiner.*